United States Patent [19]
Deligniers et al.

[11] 3,731,204
[45] May 1, 1973

[54] FREQUENCY TRACKING DEVICE

[75] Inventors: Robert Deligniers, Colombes; Alain Ausset, Rueil-Malmaison, both of France

[73] Assignee: Institut Francais du Petrole des Carburants et Lubrifiants, Rueil-Malmaison (Hauts-de-Seine), France

[22] Filed: Sept. 20, 1971

[21] Appl. No.: 182,039

[30] Foreign Application Priority Data

Sept. 25, 1970 France .......................... 7034947

[52] U.S. Cl. ..................... 328/134, 328/14, 328/158
[51] Int. Cl. .............................................. H03b 3/04
[58] Field of Search .................. 328/134, 141, 160, 328/14, 158

[56] References Cited
UNITED STATES PATENTS 2,879,384   3/1959   Sprecher ............................ 328/134
3,458,823   7/1969   Nordahl ........................... 328/141 X
3,515,997   6/1970   Babany ............................. 328/134
T886,006    5/1971   Nichols ............................ 328/160
3,636,270   1/1972   McIntosh .......................... 328/141 X Primary Examiner—John S. Heyman
Attorney—Craig, Antonelli & Hill

[57] ABSTRACT

Frequency tracking device for determining the frequency shift between the predominant frequency of an input signal spectrum and a reference frequency, comprising means for generating a local signal of controlled frequency, means for producing a resultant signal at a frequency which is the sum of the respective frequencies of the input signal and the local signal and means for controlling the frequency of said local signal in response to the phase difference between the phase of said resultant signal and the phase of a signal at twice the reference frequency.

2 Claims, 7 Drawing Figures

FREQUENCY TRACKING DEVICE

This invention relates to a frequency tracking device for detecting the predominant characteristic frequency of a signal whose frequency spectrum has a non-null width s(t) and S(ω) being respectively the amplitude of the signal versus time and the amplitude of its Fourier's transform in frequency, such a device provides means for detecting a "line" $R(t)e^{j\phi(t)}$ equivalent to the resultant (predominant frequency) of the spectrum and whose amplitude is given by the equation:

$$R(t)e^{j\phi_0(t)} = \int_{-\infty}^{+\infty} S(\omega) e^{j\phi(\omega)} e^{j\omega t} d\omega \qquad (1)$$

with $\phi c(t) = \omega_c t + \phi_c(t)$ (2)

in which $\omega_c$ is the pulsation of the "line" equivalent to the resultant of the spectrum and $\phi_c(t)$ a phase term.

When the spectrum S(ω) is symmetrical, the frequency to be detected is the central frequency.

A tracking device is used for the treatment of a signal of variable duration which may be repeated in an aleatory manner on a background of permanent "noise." The frequency spectrum of the signal may be modulated in frequency and its spectral distribution may vary during time. The characteristics of the device are defined in terms of accuracy in the measurement of predominant frequency, of its "detection threshold" i.e., the value of the signal-to-noise ratio, of its setting time (time for obtaining the coincidence of its own oscillator frequency with the frequency to be detected), and its memorization time, i.e., the time during which it kepts in memory a frequency when the input signal has momentarily disappeared.

The most commonly used frequency tracking devices are formed of loop circuits comprising an analogous mixer or phase comparator forming the product of the input signal with a signal of variable frequency issued from a local oscillator. The signal generated by the latter has a frequency which varies as a function of the input voltage supplied thereto. A low-pass filter keeps the low frequency component of the signal issued from the mixer and supplies the same to the input terminal of the oscillator.

As it will be later explained more in detail, the desired accuracy of the results cannot be obtained, due to several factors of systematic error e.g. the difficulties of filtering at very low frequencies and the non-linearity of the transfer function of the mixer.

It is therefore an object of this invention to provide a frequency tracking device for determining with a high accuracy the frequency difference between the predominant frequency $f$ of the spectrum of a signal and that of a reference signal and which has a very short setting time and a long memorization time.

It comprises means for generating a local signal whose frequency depends on a control signal, means for making the product of an input signal with said local signal, filtering means for eliminating the low frequency component of the resultant signal formed by said product, and, in addition, means for producing a signal proportional to the phase difference between the phase of said resultant signal, after filtering thereof, and the phase of a signal at a frequency multiple of the frequency fo of the reference signal and or producing said control signal as a function of said signal proportional to the phase difference.

The particular features of the devices according to the invention as well as their advantages will be made apparent from the following description given with reference to the accompanying drawings wherein :

FIG. 1 diagrammatically shows a frequency tracking device of a known type.

Figure 4:
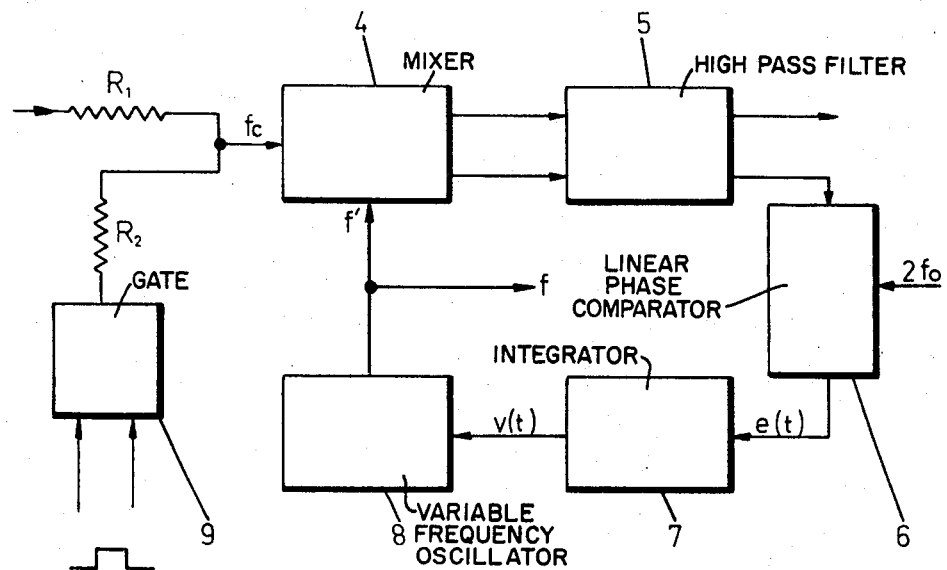

FIG. 4 diagrammatically shows the arrangement of a first embodiment of the frequency tracking device according to the invention.

Figure 5:
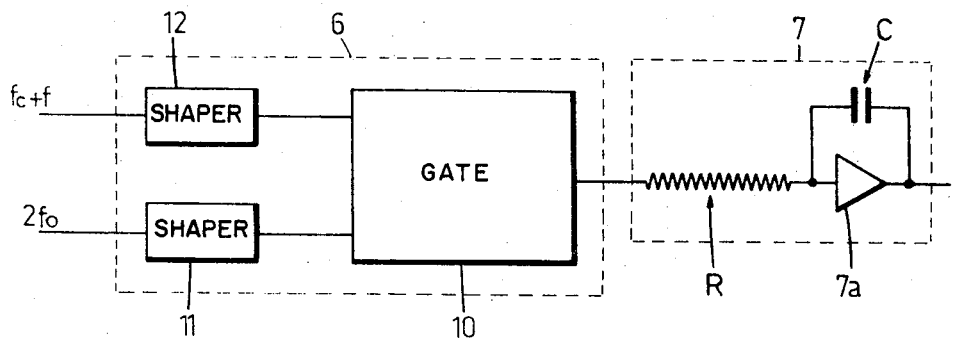

FIG. 5 diagrammatically shows, by way of example, the arrangement of a phase comparator which may be used in any one of the various embodiments of the device according to the invention.

Figure 6:
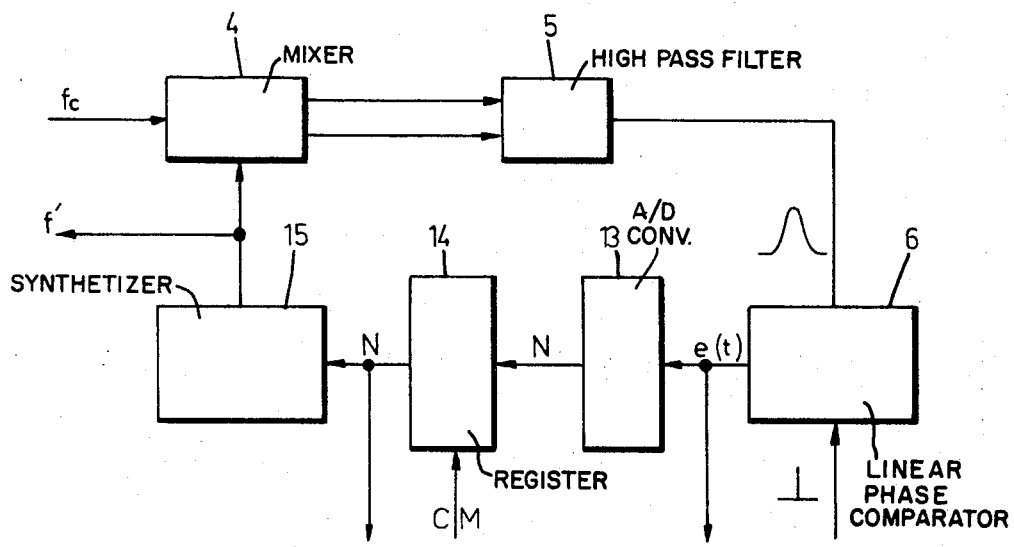
Figure 7:
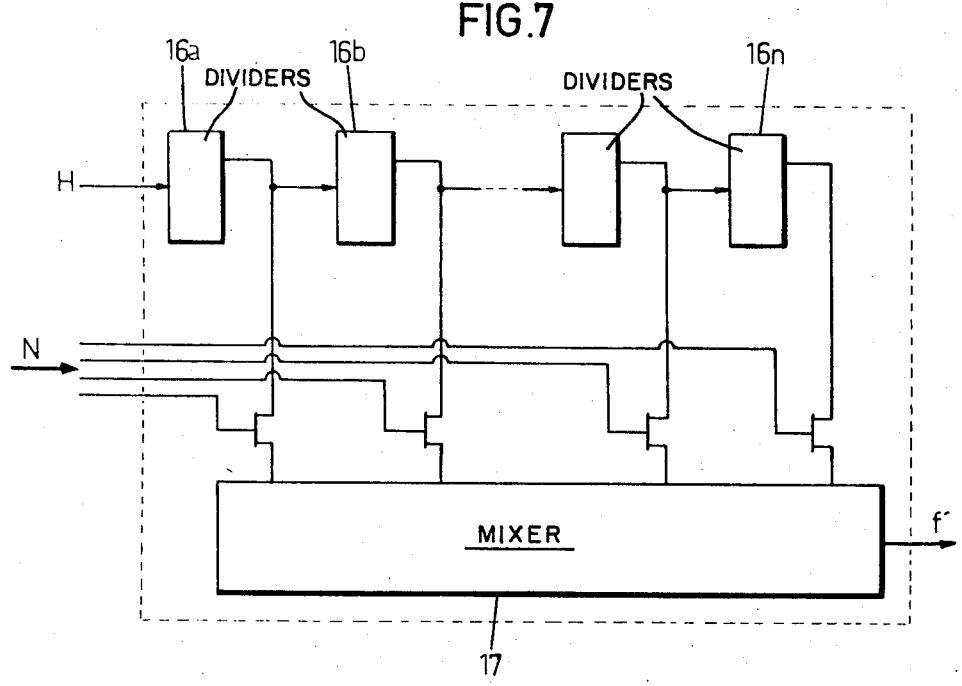

FIG. 6 diagrammatically shows the arrangement of a second embodiment of the frequency tracking device according to the invention, and FIG. 7 diagrammatically shows a frequency synthesizer which can be used in the second embodiment of the device according to the invention.

Figure 1:
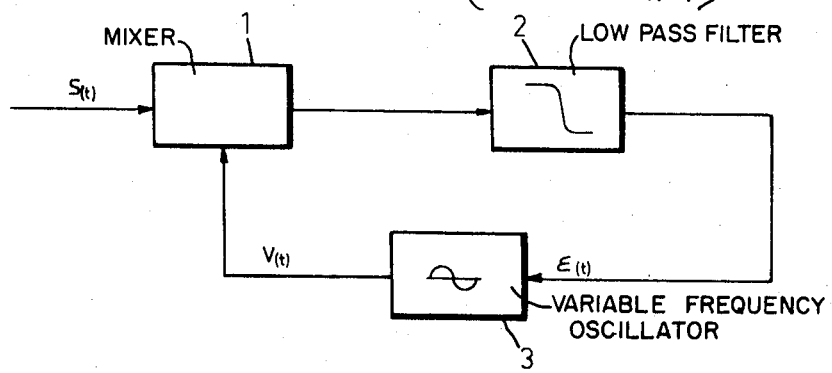

The frequency tracking device of known type illustrated in FIG. 1 consists of a loop comprising in series an analogous mixer or phase comparator 1, a low-pass filter 2 and a variable frequency oscillator 3. The signal $v(t)$ issued from the oscillator and whose frequency varies as a function of the amplitude of signal $\epsilon(t)$ produced by the low-pass filter 2, is mixed in the comparator 1 with the input signal s(t).

Figure 2:
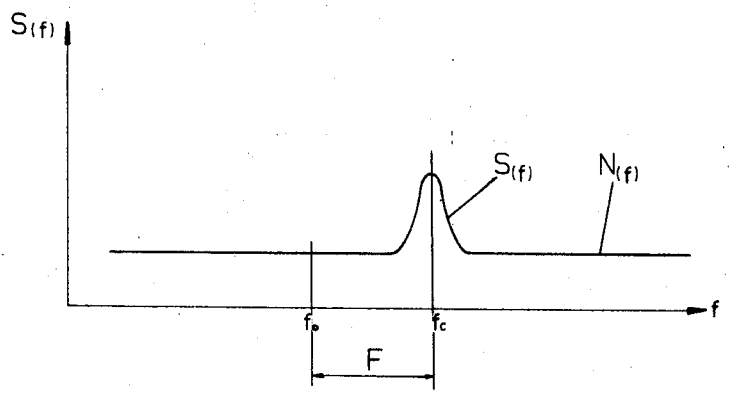
FIG. 2 shows the specific features of the frequency spectrum of the signal supplied to the frequency tracking device.

The frequency spectrum s(f) of the input signal s(t) is superimposed to a "noise" spectrum N(f) (FIG. 2) which, for example, may be uniform.

The spectrum S(f) is, for example, centered on a frequency fc, shifted by a quantity F with respect to a reference frequency fo.

Figure 3:
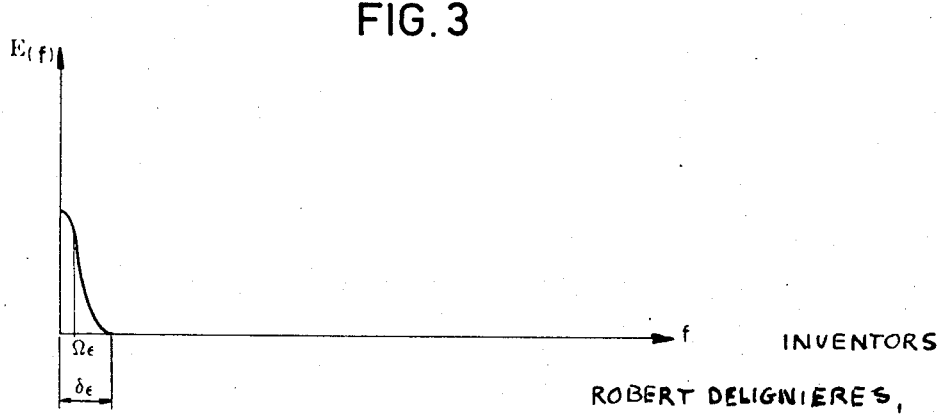
FIG. 3 shows the shape of the signal spectrum issuing from the low-pass filter included in the frequency tracking device of the type shown in FIG. 1.

The systematic error factors appearing in the measurements carried out by means of such a frequency tracking device, are made obvious from the following remarks:

a. the frequency spectrum E(f) of signal $\epsilon(t)$, issued from the low-pass filter 2, has a width $\delta\epsilon$ and its resultant has a not null pulsation $\Omega\epsilon$ (FIG. 3). Due to the fact that said signal $\epsilon(t)$ is formed only by a fraction of the initial spectrum, said pulsation $\Omega\epsilon$ is affected by a systematic factor of error, inherent to the low frequency filtering, and which is the greater when the gap F tends to zero and it is desired to obtain high values of the "detection threshold." Moreover such a filtering is not easily carried out from a technological point of view;

b. the low frequency signal issued from mixer 1 and the low-pass filter is of the form Cos ( ω − ω')t ( ω and ω' being the pulsations of the signals feeding comparator 1). The transfer function of these elements is not linear in frequency;

c. this non-linearity is detrimental to the stability of the performances of the frequency tracking device when signal s(t) is modulated in frequency and that consequently the comparator 1 works in a large band width;

d. finally, when a deformation of the envelope of the frequency spectrum is superimposed to a frequency modulation, the characteristic frequency of the spectrum of the input signal s(t) is shifted by a quantity which depends on said parasitic deformation.

The frequency tracking device object of the invention illustrated in FIG. 4 avoids the above-mentioned drawbacks. It makes possible to prevent the deformation of the frequency spectrum of the input signal and more particularly th preserve its symmetry even when the value of F tends to zero. It also makes possible to use a phase comparison method with respect to a steady frequency, by using a linear phase comparator.

The device according to the invention comprises a frequency changer 4 receiving the input signal the characteristic frequency fc of which has to be evaluated and a signal at frequency $f'$ supplied by an oscillator 8 controlled by means of an electric voltage. The frequency changer 4 makes the product of the two signals. This operation is defined by the following equation:

$$\cos 2\pi f_c t \cdot \cos 2\pi f' t = \tfrac{1}{2} [\cos 2\pi (f_c + f')t + \cos 2\pi (f_c - f')t] \quad (3)$$

A high-pass filter 5 takes off the low frequency components of this product. The frequency changer 4 and the filter 5 act merely as a frequency transposing device.

This operation of filtering the low frequencies is more simple to carry out than that of filtering the high frequencies in the known devices.

The shift, towards the high frequencies, of the spectrum of the input signal makes possible to preserve its symmetry and to avoid the systematic factor or error due to its reduction to a fraction of the initial spectrum.

The device further comprises a linear phase comparator 6 which compares the phase of the high frequency component to that of a signal having a frequency 2 fo.

It produces a signal e(t) which is supplied to an integrator 7. The signal v(t) issued from the latter constitutes the control voltage of oscillator 8.

The phase comparator, illustrated in a non-limitative manner in FIG. 5, comprises, for example, an electronic gate of the "OR exclusive" type, receiving the signal at frequency 2 fo and the signal issued from filter 5, preliminarily subjected to an amplitude clipping in re-shaping elements 11 and 12 (e.g. Schmidt triggers).

The integrator is formed, in known manner, of an operational amplifier 7 A receiving the signal issued from the phase comparator 6, through a resistor R and provided with a feed-back circuit including a capacitor C.

The signal e(t) issued from the phase comparator is of the form:

$$e(t) = e_o T_o (f_c + f' - 2f_o) \quad (4)$$

$T_o$ being equal to $1/f_o$ and $e_o$ being a constant.

The voltage produced by integrator 7 is of the form:

$$u(t) = (1/RC) \int e(t)\, dt \quad (5)$$

or still $$u(t) = (e_o T_o/RC) \int (f_c + f' - 2f_o)\, dt \quad (6)$$

taking into account the equation (3).

Let $e_o/RC$ be $u_o$ and the phase term $\Delta\phi(t)$ be the integration result; equation (6) can thus be written:

$$u(t) = u_o T_o \Delta\phi(t) \quad (7)$$

The phase term $\Delta\phi(t)$ is formed of a constant part $\phi_o$ and a variable part $\phi(t)$ proportional to the frequency difference $(f_c + f' - 2f_o)$. It can be written as follows:

$$\Delta\phi(t) = \phi_o + k(f_c + f' - 2f_o)t \quad (8)$$

$k$ being a proportionality coefficient.

In view of equation 8, the equation 7 can be written as follows:

$$u(t) = u_o T_o \phi_o + k u_o T_o (f_c + f' - 2f_o)t \quad (9)$$

The voltage $u(t)$ is formed of a constant part $u_o T_o \phi_o$ and a variable part $k u_o T_o (f_c + f' - 2f_o)t$ which is designated as $v(t)$.

The oscillator, controlled by voltage, produces a signal at frequency $f'$, whose variation as a function of $v(t)$ conforms to a relationship of the type:

$$f' = f_o - av(t) \quad (10)$$

($a$ being a constant).

Putting down:

$$f_c = f_o + F \quad (11)$$

it results that the frequency $f'$, expressed as a function of the above-defined voltage $v(t)$, can be written:

$$f' = f_o - (a k u_o T_o / 1 + a k u_o T_o) F \quad (12)$$

By selecting the constants $a$, $k$ and $u_o$ so that $a k u_o T_o \gg 1$, the frequency $f'$ of the signal produced by the oscillation can be written simply:

$$f' = f_o - F \quad (13)$$

The value of this frequency $f'$ is symmetrical of that of the frequency $f_c$ with respect to $f_o$. It is apparent that, in this device, the phase comparator works about a reference frequency $2 f_o$. The signal $e(t)$ issued therefrom is essentially linear and is nullified when the frequency tracking device is "set" on the frequency $f_o - F$.

In order to prevent that the frequency tracking device be uncontrolled or have a drift during any temporary interruption of the input signal or when the frequency of the latter is only measured at discontinuous time intervals, it is controlled by a signal at a reference frequency. In such cases, the input terminal of modulator 4 (FIG. 4) receives, through a resistor $R_1$, the input signal and, through a resistor $R_2$, the signal produced by a gate 9. By means of this additional circuit it is possible to feed the frequency tracking device with a signal at the frequency $f_o$, of an amplitude equal to that of the uniform and permanent "noise" spectrum, superimposed to the useful signal. During the time interval selected for measuring the frequency of the input signal, the gate 9 interrupts the signal at the frequency $f_o$. This gate 9 may consist, for example, of a field-effect transistor fed with a signal at frequency $f_o$ and controlled by signals delimiting the measuring time interval.

The frequency tracking device diagrammatically shown in FIG. 6 is a modified embodiment of the device of FIG. 4, comprising a digital line. It provides for a high accuracy of the frequency measurement and of the output in real time of the value thereof. The degree of accuracy thus obtained is, for example, of about $10^{-7}$ to $10^{-9}$.

The frequency tracking device comprises in series the above-defined elements 4, 5 and 6. The voltage $e(t)$ produced by the phase or frequency comparator 6 is coded in a digital form in an analogical-digital converter 13 of known type. The signal N, in a coded digital form of base B produced by said converted 13, is memorized in a register 14. This transfer to register 14 is controlled by a signal CM supplied to the input terminal of the "memory" thereof. The signal or "word" N feeds a frequency synthetizer 15.

As shown in FIG. 7, the synthetizer comprises in particular a chain of dividers 16a, 16b . . . 16n of the frequency by the base B, connected in series. This chain is fed with a signal at a reference frequency. In accordance with the binary expression of the "word" N, a certain number of signals at sub-multiple frequencies of that of the reference signal are transferred to a mixer 17 which makes the sum. The synthetized signal, issued from the mixer 17, has a frequency equal to $f'$ such as hereabove defined.

The phase or frequency comparator 6 is fed with a reference signal at frequency $2 f_o$. The selection of this frequency is not limitative. More generally there can be chosen a signal at frequency $mf_o$, $m$ being greater than one, preferably an integer higher than or equal to two.

In this case the signal generated by the frequency tracking device will have a frequency substantially equal to $(m-1)f_o - F$.

We claim:

1. A frequency tracking device for generating a signal whose frequency depends on the predominant frequency of an input signal spectrum comprising means for mixing the input signal with a local signal whose frequency depends on a control signal to provide a resultant signal, filtering means connected with said mixing means for eliminating the low frequency component of the resultant signal issued from said mixing means, means for producing the control signal in the form of a linear function of the phase difference between the phase of the signal issued from the filtering means and the phase of a signal applied to the control signal producing means at a frequency multiple of the constant frequency of a reference signal, and means responsive to the control signal providing means for generating the local signal in accordance with the control signal.

2. A device according to claim 1, wherein the means for generating the local signal comprises first means connected with the control signal producing means for converting the control signal to a binary digital signal, second means connected with the converting means for memorizing the digital signal, and third means responsive to the digital signal for synthetizing the local signal whose frequency depends on the binary value of the digital signal.

* * * * *